US012781074B2

(12) United States Patent
Kikuchi et al.

(10) Patent No.: US 12,781,074 B2
(45) Date of Patent: Nov. 3, 2026

(54) INK JET INK COMPOSITION, RECORDING METHOD, AND RECORDED MATERIAL

(71) Applicant: SEIKO EPSON CORPORATION, Tokyo (JP)

(72) Inventors: Kenta Kikuchi, Suwa (JP); Hiroaki Kumeta, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 1060 days.

(21) Appl. No.: 17/894,199

(22) Filed: Aug. 24, 2022

(65) Prior Publication Data

US 2023/0085490 A1 Mar. 16, 2023

(30) Foreign Application Priority Data

Aug. 25, 2021 (JP) ................................ 2021-136941

(51) Int. Cl.

*C09D 11/38* (2014.01)
*C09D 11/322* (2014.01)
*C09D 11/328* (2014.01)

(52) U.S. Cl.

CPC ............ *C09D 11/38* (2013.01); *C09D 11/322* (2013.01); *C09D 11/328* (2013.01)

(58) Field of Classification Search

CPC ..... C09D 11/38; C09D 11/322; C09D 11/328; C09D 11/14; C09D 11/06

See application file for complete search history.

(56) References Cited

U.S. PATENT DOCUMENTS

| | | | | | |
|---|---|---|---|---|---|
| 5,626,654 | A * | 5/1997 | Breton | C09D 11/30 | 347/100 |
| 5,788,749 | A * | 8/1998 | Breton | C09D 11/322 | 106/31.86 |
| 5,911,816 | A * | 6/1999 | Gore | C09D 11/30 | 106/31.86 |
| 6,013,122 | A * | 1/2000 | Klitzman | C09D 11/00 | 106/31.03 |
| 6,261,350 | B1 | 7/2001 | Kabalnov | | |
| 8,616,693 | B1 | 12/2013 | Toosi et al. | | |
| 2003/0082231 | A1* | 5/2003 | Kos | A61K 47/24 | 424/480 |
| 2005/0036018 | A1* | 2/2005 | Yanagihara | D06P 5/30 | 347/100 |
| 2007/0247504 | A1* | 10/2007 | Koganehira | C09D 11/322 | 106/31.89 |
| 2008/0160084 | A1* | 7/2008 | Huynh | C09B 63/00 | 106/125.1 |
| 2011/0318406 | A1* | 12/2011 | Eley | A23L 27/12 | 426/654 |
| 2013/0098265 | A1* | 4/2013 | Story | C09D 11/20 | 106/31.03 |
| 2022/0402265 | A1* | 12/2022 | Tanaka | C09D 11/322 | |
| 2023/0398058 | A1* | 12/2023 | Pierre | A61K 8/0241 | |

FOREIGN PATENT DOCUMENTS

| | | | | |
|---|---|---|---|---|
| JP | 59230071 | A * | 12/1984 | |
| JP | 2514057 | B2 * | 7/1996 | A61K 9/127 |
| JP | H10-231449 | A | 9/1998 | |
| JP | 2001-123099 | A | 5/2001 | |
| JP | 2014-109031 | A | 6/2014 | |

OTHER PUBLICATIONS

English machine translation of JP-59230071-A (Year: 1984).*
English machine translation of JP-2514057-B2 (Year: 1996).*

* cited by examiner

*Primary Examiner* — Amber R Orlando
*Assistant Examiner* — Jeffrey Eugene Barzach
(74) *Attorney, Agent, or Firm* — Harness, Dickey & Pierce, P.L.C.

(57) ABSTRACT

An ink jet ink composition includes water, a phospholipid that forms a fine particle, and a coloring material that is incorporated in the fine particle.

10 Claims, No Drawings

INK JET INK COMPOSITION, RECORDING METHOD, AND RECORDED MATERIAL

The present application is based on, and claims priority from JP Application Serial Number 2021-136941, filed Aug. 25, 2021, the disclosure of which is hereby incorporated by reference herein in its entirety.

BACKGROUND

1. Technical Field

The present disclosure relates to an ink jet ink composition, a recording method, and a recorded material.

2. Related Art

In the related art, inks formed of coloring materials derived from natural products in order to reduce a load on the environment have been known. For example, JP-A-2014-109031 discloses an ink composition containing a colorant derived from nature or a natural source and a dispersant.

However, the ink composition described in JP-A-2014-109031 has a problem that the image quality of a recorded material and the jetting stability of the ink from an ink jet head are difficult to improve. Specifically, coloring materials derived from natural products have restrictions in the molecular structures such as substituents as compared with synthesized coloring materials. Since the molecular structures of the coloring materials are limited, in the ink composition formed of a coloring material derived from a natural product, bleeding is likely to occur in a recorded material in a case of using a water-soluble coloring material and the jetting stability is likely to decrease in a case of using a water-insoluble coloring material as compared with a case of using a synthesized coloring material. That is, there is still a demand for an ink jet ink composition that enables improvement of the image quality of the recorded material and the jetting stability even when a coloring material derived from a natural product is used.

SUMMARY

An ink jet ink composition contains water, a phospholipid that forms a fine particle, and a coloring material that is incorporated in the fine particle.

A recording method includes jetting the ink jet ink composition from an ink jet head to adhere to a recording medium.

A recorded material is formed by adhesion of the ink jet ink composition to a recording medium.

DESCRIPTION OF EXEMPLARY EMBODIMENTS

1. Ink Jet Ink Composition

An ink jet ink composition according to the present embodiment contains water, a coloring material, and a phospholipid. In the ink jet ink composition, the phospholipid forms a fine particle that incorporates the coloring material. The coloring material is incorporated in the fine particle. In the description below, the ink jet ink composition of the present embodiment will also be simply referred to as the ink, and the fine particle that is formed of the phospholipid and incorporates the coloring material will also be simply referred to as the fine particle. Hereinafter, various components contained in the ink will be described.

1.1. Water

Water is a main solvent of the ink of the present embodiment. That is, the ink is an aqueous ink. Water is a component that is evaporated by being dried after adhesion of the ink to the recording medium. Water obtained by removing ionic impurities as much as possible, for example, pure water such as ion exchange water, ultrafiltration water, reverse osmosis water, or distilled water or ultrapure water can be employed as water. Further, when water sterilized by irradiation with ultraviolet rays or addition of hydrogen peroxide is used, growth of mold or bacteria is suppressed in a case where the treatment liquid is stored for a long period of time.

The content of water contained in the ink is not particularly limited, but is preferably 5% by mass or greater, more preferably 7% by mass or greater and 99% by mass or less, still more preferably 9% by mass or greater and 80% by mass or less, even still more preferably 10% by mass or greater and 75% by mass or less, even still more preferably 15% by mass or greater and 70% by mass or less, even still more preferably 40% by mass or greater and 70% by mass or less, and even still more preferably 50% by mass or greater and 70% by mass or less with respect to the total mass of the ink. When the content of water is set to be in the above-described ranges, the jettability of the ink from an ink jet head and the drying properties after adhesion to the recording medium are improved.

1.2. Coloring Material

The coloring material remains on the recording medium when the ink adheres to the recording medium and exhibits a color specific to the coloring material. Color images, patterns, texts, and the like are prepared by using a plurality of coloring materials exhibiting different colors. The color exhibited by the coloring material on the recording medium, that is, the color development density is referred to as color developability, and the color developability is excellent as the color development density increases.

Any of a water-soluble coloring material or a water-insoluble coloring material is used as the coloring material. Further, the water-insoluble coloring material denotes a coloring material in which the solubility in 100 g of water at 20° C. is less than 0.1 g, and in the present specification, examples thereof also include coloring materials that are sparingly soluble in water.

1.2.1. Water-Soluble Coloring Material

As the water-soluble coloring material, a water-soluble dye is used. Examples of the water-soluble dye include acidic dyes, direct dyes, and basic dyes. Known dyes can be employed as the water-soluble dye. Hereinafter, the water-soluble dye will also be simply referred to as a dye.

Examples of the acidic dyes include C.I. (Colour Index Generic Name) Acid Blue 1, 7, 9, 15, 22, 23, 25, 27, 29, 40, 41, 43, 45, 49, 54, 59, 60, 62, 72, 78, 80, 82, 83, 90, 92, 93, 100, 102, 103, 104, 112, 113, 117, 120, 126, 127, 129, 130, 131, 133, 138, 140, 142, 143, 151, 154, 158, 161, 166, 167, 168, 170, 171, 175, 182, 183, 184, 185, 187, 192, 193, 199, 203, 204, 205, 225, 229, 234, 236, 247, 249, and 300, C.I. Acid Red 1, 6, 8, 9, 13, 14, 18, 19, 24, 26, 27, 28, 32, 35, 37, 42, 51, 52, 57, 62, 75, 77, 80, 82, 83, 85, 87, 88, 89, 92, 94, 95, 97, 106, 111, 114, 115, 117, 118, 119, 129, 130, 131, 133, 134, 138, 143, 145, 149, 154, 155, 158, 168, 180, 183, 184, 186, 194, 198, 199, 209, 211, 215, 216, 217, 219, 249, 252, 254, 256, 257, 260, 263, 265, 266, 274, 276, 282, 283, 289, 303, 317, 318, 320, 321, 322, 361, and 407, C.I. Acid Yellow 1, 3, 7, 11, 17, 19, 25, 29, 32, 36, 38, 40, 42, 44, 49, 59, 61, 70, 72, 75, 76, 78, 79, 98, 99, 110, 111, 112, 114, 116, 118, 119, 127, 128, 131, 135, 141, 142, 161, 162, 163, 164, 165, 169, 184, 207, 219, and 246, C.I. Acid Black 1, 2, 7, 24, 26, 29, 31, 44, 48, 50, 51, 52, 52:1, 58, 60, 62, 63, 64, 67, 72, 76, 77, 94, 107, 108, 109, 110, 112, 115, 118, 119, 121, 122, 131, 132, 139, 140, 155, 156, 157, 158, 159, 172, 191, and 234, C.I. Acid Orange 1, 7, 8, 10, 19, 20, 24, 28, 33, 41, 43, 45, 51, 56, 63, 64, 65, 67, 74, 80, 82, 85, 86, 87, 88, 94, 122, 123, and 124, C.I. Acid Violet 7, 11, 15, 31, 34, 35, 41, 43, 47, 48, 49, 51, 54, 66, 68, 75, 78, 97, and 106, C.I. Acid Green 3, 7, 9, 12, 16, 19, 20, 25, 27, 28, 35, 36, 40, 41, 43, 44, 48, 56, 57, 60, 61, 65, 73, 75, 76, 78, and 79, and C.I. Acid Brown 2, 4, 13, 14, 19, 20, 27, 28, 30, 31, 39, 44, 45, 46, 48, 53, 100, 101, 103, 104, 106, 160, 161, 165, 188, 224, 225, 226, 231, 232, 236, 247, 256, 257, 266, 268, 276, 277, 282, 289, 294, 295, 296, 297, 298, 299, 300, 301, and 302.

Examples of the direct dyes include C.I. Direct Blue 1, 2, 6, 9, 15, 22, 25, 41, 71, 76, 77, 78, 80, 86, 87, 90, 98, 106, 108, 120, 123, 158, 160, 163, 165, 168, 192, 193, 194, 195, 196, 200, 201, 202, 203, 207, 225, 226, 236, 237, 246, 248, and 249, C.I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230, and 231, C.I. Direct Yellow 1, 8, 11, 12, 24, 26, 33, 39, 44, 50, 58, 85, 86, 87, 88, 89, 98, 110, 132, 142, and 144, and C.I. Direct Black 17, 19, 22, 32, 35, 38, 51, 56, 62, 71, 74, 75, 77, 94, 105, 106, 107, 108, 112, 113, 117, 118, 132, 133, 146, 154, 168, and 171.

It is preferable to use a dye derived from an animal or a plane as the water-soluble coloring material. The expression "derived from an animal or a plane" denotes an extract from an animal or a plane, a fermented material thereof, and a processed material thereof which does not contain underground resources. In this manner, a load on the environment can be reduced by using a coloring material that is not derived from underground resources such as petroleum.

Examples of the dye derived from an animal or a plane include a berry-based coloring agent (an extract from cranberries, strawberries, blackberries, blueberries, boysenberries, whortleberries, or raspberries) such as a cochineal coloring agent, a gardenia yellow coloring agent, a safflower yellow coloring agent, a monascus yellow coloring agent, a saffron coloring agent, a monascus red coloring agent, a gardenia red coloring agent, a safflower red coloring agent, a beet red coloring agent, a perilla coloring agent, a hibiscus coloring agent, a red cabbage coloring agent, a red radish coloring agent, a purple sweet potato coloring agent, a purple corn coloring agent, a grape skin coloring agent, a red currant coloring agent, a purple carrot coloring agent, or an elderberry coloring agent, a grape juice coloring agent, a gardenia blue coloring agent, a spirulina coloring agent, a butterfly pea coloring agent, a cacao coloring agent, a Japanese persimmon coloring agent, a caramel coloring agent, a kaoliang coloring agent, an onion coloring agent, a tamarind coloring agent, a malt extract, a layer coloring agent, and a porphyrin coloring agent.

As the dye derived from an animal or a plant, a dye that is bonded to a metal to form a chelate complex, such as tin mordanting of a cochineal coloring agent, may be used. According to such a dye, the dye that forms a chelate complex is protected by being incorporated in fine particles. Therefore, the interaction between the metal ions and the coloring material in the ink is suppressed so that occurrence of discoloration in the recorded material is suppressed. The fine particles will be described in detail below.

When the ink contains the water-soluble coloring material, the content of the water-soluble coloring material is not particularly limited, but is preferably 0.5% by mass or greater and 30.0% by mass or less, more preferably 1.0% by mass or greater and 25.0% by mass or less, still more preferably 1.0% by mass or greater and 20.0% by mass or less, even still more preferably 2.0% by mass or greater and 10.0% by mass or less, and even still more preferably 3.0% by mass or greater and 6.0% by mass or less with respect to the total mass of the ink. When the content of the water-soluble coloring material is set to be in the above-described ranges, color development in the recorded material is ensured, and an increase in thickening of the ink and occurrence of clogging of a nozzle in an ink jet head are suppressed.

1.2.2. Water-Insoluble Coloring Material

As the water-insoluble coloring material, an oil-soluble dye, a dispersed dye, a pigment, or the like is used. A known dye can be employed as the water-insoluble coloring material.

Examples of the oil-soluble dye include C.I. Solvent Black 3, 5, and 7, C.I. Solvent Yellow 2, 4, 7, 14, 16, 33, 56, and 93, C.I. Solvent Blue 5, 35, 70, and 94, Solvent Red 1, 3, 18, 19, 23, 24, 27, 49, and 197, C.I. Solvent Violet 8, C.I. Solvent Orange 2 and 7, Solvent Green 3, Nile red, Phenylazoresorcinol, Quinizarin, and Quinizarin Blue.

Examples of the dispersed dye include C.I. Disperse Blue 3, 7, 9, 14, 16, 19, 20, 26, 27, 35, 43, 44, 54, 55, 56, 58, 60, 62, 64, 71, 72, 73, 75, 79, 81, 82, 83, 87, 91, 93, 94, 95, 96, 102, 106, 108, 112, 113, 115, 118, 120, 122, 125, 128, 130, 139, 141, 142, 143, 146, 148, 149, 153, 154, 158, 165, 167, 171, 173, 174, 176, 181, 183, 185, 186, 187, 189, 197, 198, 200, 201, 205, 207, 211, 214, 224, 225, 257, 259, 267, 268, 270, 284, 285, 287, 288, 291, 293, 295, 297, 301, 315, 330, 333, and 360, C.I. Disperse Red 1, 4, 5, 7, 11, 12, 13, 15, 17, 27, 43, 44, 50, 52, 53, 54, 55, 56, 58, 59, 60, 65, 72, 73, 74, 75, 76, 78, 81, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 159, 164, 167, 169, 177, 179, 181, 183, 184, 185, 188, 189, 190, 191, 192, 200, 201, 202, 203, 205, 206, 207, 210, 221, 224, 225, 227, 229, 239, 240, 257, 258, 277, 278, 279, 281, 288, 298, 302, 303, 310, 311, 312, 320, 324, and 328, C.I. Disperse Yellow 3, 4, 5, 7, 9, 13, 23, 24, 30, 33, 34, 42, 44, 49, 50, 51, 54, 56, 58, 60, 63, 64, 66, 68, 71, 74, 76, 79, 82, 83, 85, 86, 88, 90, 91, 93, 98, 99, 100, 104, 108, 114, 116, 118, 119, 122, 124, 126, 135, 140, 141, 149, 160, 162, 163, 164, 165, 179, 180, 182, 183, 184, 186, 192, 198, 199, 202, 204, 210, 211, 215, 216, 218, 224, 227, 231, and 232, C.I. Disperse Black 1, 3, 10, and 24, C.I. Disperse Orange 1, 3, 5, 7, 11, 13, 17, 20, 21, 25, 29, 30, 31, 32, 33, 37, 38, 42, 43, 44, 45, 46, 47, 48, 49, 50, 53, 54, 55, 56, 57, 58, 59, 61, 66, 71, 73, 76, 78, 80, 89, 90, 91, 93, 96, 97, 119, 127, 130, 139, and 142, C.I. Disperse Violet 1, 4, 8, 23, 26, 27, 28, 31, 33, 35, 36, 38, 40, 43, 46, 48, 50, 51, 52, 56, 57, 59, 61, 63, 69, and 77, C.I. Disperse Green 9, and C.I. Disperse Brown 1, 2, 4, 9, 13, and 19.

Known organic pigments and inorganic pigments can be employed as the pigment. Examples of the organic pigments include an azo pigment such as an azo lake pigment, an insoluble azo pigment, a condensed azo pigment, or a chelate azo pigment, a polycyclic pigment such as a phthalocyanine pigment, a perylene pigment, a perinone pigment, an anthraquinone pigment, a quinacridone pigment, a dioxazine pigment, a thioindigo pigment, an isoindolinone pigment, an isoindoline pigment, a quinophthalone pigment, or a diketopyrrolopyrrole pigment, a dye lake pigment such as basic dye type lake or acidic dye type lake, a nitro pigment, a nitroso pigment, Aniline Black, and a daylight fluorescent pigment. Examples of the inorganic pigments include a metal oxide pigment such as titanium dioxide, zinc oxide, or chromium oxide, and carbon black. Further, a bright pigment such as a pearl pigment or a metallic pigment may be used as the pigment.

Specific examples of a pigment for black ink include C.I. Pigment Black 1, 7, and 11, and examples of a pigment for white ink include C.I. Pigment White 6, 18, and 21.

Examples of a yellow pigment include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, and 180.

Examples of a magenta pigment include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245, and C.I. Pigment Violet 19, 23, 32, 33, 36, 38, 43, and 50.

Examples of a cyan pigment include C.I. Pigment Blue 1, 2, 3, 15, 15:1, 15:2, 15:3, 15:34, 15:4, 16, 18, 22, 25, 60, 65, and 66, and C.I. Vat Blue 4 and 60.

Examples of pigments for colors other than the colors described above include C.I. Pigment Green 7 and 10, C.I. Pigment Brown 3, 5, 25, and 26, and Pigment Orange 1, 2, 5, 7, 13, 14, 15, 16, 24, 34, 36, 38, 40, 43, and 63.

Known coloring materials, such as a leuco dye, in addition to the coloring materials described above may be used as the water-insoluble coloring material.

It is preferable to use an oil-soluble dye derived from an animal or a plant or a pigment as the water-insoluble coloring material. Examples of the oil-soluble dye derived from an animal or a plant include a carotenoid-based coloring agent such as palm oil carotenoids, a Marigold coloring agent, a tomato pigment, a haematococcus algae coloring agent, an annatto coloring agent, or a paprika coloring agent, a safflower red coloring agent, a lac coloring agent, Indian indigo, turmeric, and β-carotene. Examples of the pigment derived from an animal or a plant include plant charcoal-based C.I. Pigment Black 7 such as Bincho charcoal or bamboo charcoal, a cuttlefish ink coloring agent, Indian indigo, a lac coloring agent, and a turmeric coloring agent. In this manner, a load on the environment can be reduced by using a coloring material that is not derived from underground resources such as petroleum.

The content of the water-insoluble coloring material is not particularly limited, but is, for example, preferably 0.5% by mass or greater and 30.0% by mass or less, more preferably 1.0% by mass or greater and 25.0% by mass or less, still more preferably 1.0% by mass or greater and 20.0% by mass or less, even still more preferably 2.0% by mass or greater and 10.0% by mass or less, and even still more preferably 3.0% by mass or greater and 6.0% by mass or less. When the content of the water-insoluble coloring material is set to be in the above-described ranges, color development in the recorded material is ensured, and an increase in thickening of the ink and occurrence of clogging of a nozzle in an ink jet head are suppressed.

1.3. Phospholipid

Phospholipids are amphipathic lipids having phosphoric acid ester moieties. The phospholipids form fine particles in an aqueous solvent.

Examples of the phospholipids include natural lecithin such as egg yolk lecithin or soybean lecithin, hydrogenated lecithin in which an unsaturated hydrocarbon in natural lecithin such as hydrogenated egg yolk lecithin or hydrogenated soybean lecithin is stabilized as a saturated hydrocarbon by hydrogenation, hydrogenated lecithin obtained by increasing the concentration of specific lecithin among the hydrogenated lecithins, and purified compounds or synthetic compounds derived from natural lecithin, such as phosphatidylcholine, phosphatidylethanolamine, phosphatidylserine, phosphatidic acid, phosphatidylinositol, or phosphatidylglycerol. These phospholipids may be used alone or in combination of two or more kinds thereof.

Commercially available products may be used as the phospholipids. Examples of the commercially available products include LECINOL S-10M (trade name, containing 55% to 65% of phosphatidylcholine) and LECINOL S-10E (trade name, containing 75% to 85% of phosphatidylcholine) (both manufactured by Nikko Chemicals Co., Ltd.), BASIS (registered trademark) LP-60HR (trade name, containing 65% to 75% of phosphatidylcholine) (manufactured by Nissin Oillio Group, Ltd.), and EGG YOLK LECITHIN PL100P (trade name, containing approximately 80% of phosphatidylcholine) (manufactured by Kewpie Corporation).

The phospholipids are aligned in an aqueous solvent to form fine particles that are bag-like membranes. The form of the fine particles varies depending on the polarity of the coloring material to be incorporated.

When the coloring material is a water-soluble coloring material, bimolecular membranes associated with phospholipids, that is, liposomes are formed. The water-soluble coloring material is incorporated in liposomes which are fine particles. In the liposomes, hydrophilic groups of phospholipids are aligned inside the liposomes incorporating the water-soluble coloring material, and hydrophobic groups of phospholipids are aligned outside the liposomes to form a first layer of a molecular membrane. Further, hydrophobic groups of phospholipids, which form a second layer of a molecular membrane, are aligned with respect to the first layer of the molecular membrane, and hydrophilic groups of phospholipids, which form the second layer of the molecular membrane, are aligned outside the liposomes. In this manner, the liposomes of the present embodiment incorporate the water-soluble coloring material, and the hydrophilic groups of the phospholipids, which form the second layer of the molecular membrane, are aligned outside the liposomes, and thus the liposomes can be dispersed in an aqueous solvent as fine particles.

The liposomes incorporating the water-soluble coloring material are produced, for example, by the following method. First, a solution is prepared by dissolving the phospholipids in an organic solvent. Examples of the organic solvent include methyl ethyl ketone, tetrahydrofuran, methanol, ethanol, propanol, butanol, water-soluble polyhydric alcohol such as glycerin, ethylene glycol, propylene glycol, butylene glycol, dipropylene glycol, 1,3-butylene glycol, or isoprene glycol, and a polyol such as 1,2-pentanediol. Here, lipids having a steroid skeleton or carbohydrates may be added to the organic solvent. The kind of organic solvent to be used is selected according to the solubility of the phospholipids, the lipids having a steroid skeleton, or the like to be used.

Next, the organic solvent is distilled off from the solution to prepare a membrane of phospholipids. When lipids having a steroid skeleton and the like are used in combination, the membrane is a mixed membrane obtained by mixing a plurality of components. The water-soluble coloring material is separately dissolved in pure water, thereby preparing an aqueous solution of the water-soluble coloring material. Next, the aqueous solution of the water-soluble coloring material is gradually added to the membrane, stirred during the addition, and heated to 75° C. from 65° C. to prepare a dispersion liquid.

Next, the dispersion liquid is subjected to an ultrasonic treatment using an ultrasonic homogenizer to reduce the particle diameter of the particles in the dispersion liquid. Thereafter, the liposomes incorporating the water-soluble coloring material are separated and recovered using a centrifuge. In addition, the liposomes are redispersed in an aqueous solvent, thereby obtaining a dispersion of fine particles incorporating the water-soluble coloring material.

When the coloring material is an oil-soluble dye or a dispersed dye of the water-insoluble coloring material, bimolecular membranes associated with phospholipids, that is, liposomes are formed. The oil-soluble dye or the dispersed dye is incorporated in a region where hydrophilic groups of a first layer of a molecular membrane and hydrophobic groups of a second layer of a molecular membrane are associated with each other in the liposomes that are fine particles. In this case, only the aqueous solvent such as water is present in the central portions of the liposomes. In this manner, the liposomes of the present embodiment incorporate the oil-soluble dye or the dispersed dye, and the hydrophilic groups of the phospholipids, which form the second layer of the molecular membrane, are aligned outside the liposomes, and thus the liposomes can be dispersed in an aqueous solvent as fine particles.

The liposomes incorporating the oil-soluble dye or the dispersed dye are produced, for example, by the following method. First, a solution is prepared by dissolving the phospholipids in the above-described organic solvent. Here, the oil-soluble dye or the dispersed dye is dissolved in the solution together with the phospholipids. Further, lipids having a steroid skeleton, carbohydrates, or a cellulose derivative described below may be added to the solution. The kind of organic solvent to be used is selected according to the solubility of the phospholipids, the lipids having a steroid skeleton, and the oil-soluble dye or the dispersed dye to be used.

Next, the organic solvent is distilled off from the solution to prepare a membrane obtained by mixing the phospholipids and the oil-soluble dye or the dispersed dye. Next, pure water is gradually added to the membrane, stirred during the addition, and heated to 75° C. from 65° C. to prepare a dispersion liquid.

Next, the dispersion liquid is subjected to an ultrasonic treatment using an ultrasonic homogenizer to reduce the particle diameter of the particles in the dispersion liquid. Thereafter, the fine particles in which the oil-soluble dye or the dispersed dye is incorporated are separated and recovered using a centrifuge. In addition, the fine particles are redispersed in an aqueous solvent, thereby obtaining a dispersion of fine particles incorporating the oil-soluble dye or the dispersed dye.

When the coloring material is a pigment of a water-insoluble coloring material, fine particles of monomolecular membranes or trimolecular membranes formed of phospholipids are formed. The pigment is incorporated in the bag-like fine particles. In the fine particles, hydrophobic groups of phospholipids are aligned inside the fine particles incorporating the pigment, and hydrophilic groups of phospholipids are aligned outside the fine particles to form fine particles of a monomolecular membrane. Further, hydrophilic groups of phospholipids, which form a second layer of a molecular membrane, are aligned with respect to the first layer of the monomolecular membrane, and hydrophobic groups of phospholipids are aligned outside the fine particles. Further, hydrophobic groups of phospholipids, which form a third layer of a molecular membrane, are aligned with respect to the second layer of the molecular membrane, and hydrophilic groups of phospholipids are aligned outside the fine particles. Here, when the water-insoluble coloring material is the oil-soluble dye or the dispersed dye, the oil-soluble dye or the dispersed dye may be incorporated in the central portions of the fine particles, similarly to the pigment described above.

In this manner, the fine particles of the monomolecular membrane or the trimolecular membrane of the phospholipids according to the present embodiment incorporate the pigment, the oil-soluble dye, or the dispersed dye, and the hydrophilic groups of the phospholipids are aligned outside the fine particles, and thus the fine particles can be dispersed in an aqueous solvent. Particularly, when the coloring material is a water-insoluble coloring material, the coloring material is required to be dispersed in water using a dispersant or the like so that the coloring material is used for an aqueous ink, but in the present embodiment, the water-insoluble coloring material can be stably dispersed in water due to the phospholipids, which is preferable.

The fine particles incorporating the pigment and the oil-soluble dye or the dispersed dye are produced, for example, by the following method. First, the phospholipids, the pigment and the oil-soluble dye or the dispersed dye, and the polyol are mixed to prepare a coalesced material. Here, the lipids having a steroid skeleton, the cellulose derivative, or the carbohydrates may be added thereto.

Next, the coalesced material is kneaded until the average particle diameter thereof reaches a desired value, thereby obtaining a kneaded material. In this manner, when the pigment is used, the particles of the pigment are crashed and the surfaces thereof are covered with the phospholipids.

Next, pure water is added to the kneaded material, and the mixture is subjected to an ultrasonic treatment using an ultrasonic homogenizer. In this manner, a dispersion of the fine particles incorporating the pigment and the oil-soluble dye or the dispersed dye is obtained. Further, the dispersion may be concentrated using a centrifuge As described above, since the ink contains the fine particles, the image quality and the jetting stability of the ink can be improved in the recorded material formed by adhesion of the ink. Specifically, the coloring material is incorporated in the fine particles of the phospholipids, and thus the coloring material is protected by the fine particles and the restrictions derived from the molecular structure originated from the coloring material are relaxed so that the characteristics are compensated. In this manner, the behavior of the coloring material in the recording medium is improved after adhesion of the coloring material to the recording medium.

When the coloring material is the water-soluble coloring material, the water resistance of the ink adhered to the recording medium is improved. Accordingly, occurrence of bleeding is suppressed even when the recorded material is wet with water. Further, the water-soluble coloring material is difficult to permeate into the recording medium and is thus likely to remain on the surface. Therefore, the color developability in the recorded material is improved. Further, in the water-soluble coloring material that is easily affected by the pH of the ink and the metal ions contained in the ink, the original color of the water-soluble coloring material is likely to develop due to the production of the fine particles. That is, the image quality of the recorded material can be improved. Particularly, when the fine particles are liposomes, the function of the membrane of the fine particles to protect the coloring material is enhanced, and thus discoloration of the recorded material can be prevented and the image quality of the recorded material is further improved. Further, since the dispersion stability or the like in the ink is excellent, the jetting stability is also improved.

When the coloring material is the water-insoluble coloring material, the dispersion stability of the fine particles in the ink is improved. Therefore, foreign matter formed by aggregation of the fine particles in the ink is unlikely to be generated, and thus the jetting stability of the ink can be improved. Further, since occurrence of nozzle jetting failure of the ink jet head is suppressed, the image quality of the recorded material is improved. Further, the coloring developability of the recorded material is excellent, and discoloration of the recorded material is satisfactorily prevented.

An average particle diameter D50 of the fine particles in the ink is preferably 50 nm or greater and 350 nm or less, more preferably 60 nm or greater and 300 nm or less, still more preferably 80 nm or greater and 250 nm or less, even still more preferably 100 nm or greater and 200 nm or less, and 130 nm or greater and 180 nm or less. When the average particle diameter D50 of the fine particles is greater than or equal to the above-described ranges, the volume of the coloring material to be incorporated in the fine particles increases, and the color developability in the recorded material is improved. When the average particle diameter D50 of the fine particles is less than or equal to the above-described ranges, the jetting stability of the ink from the ink jet head is further improved.

The average particle diameter D50 denotes the 50% volume-based particle size distribution. The average particle diameter D50 of the fine particles is measured by the dynamic light scattering method or the laser diffraction method described in JIS Z 8825. Specifically, a commercially available particle size distribution meter that performs measurement in conformity with the dynamic light scattering method as a measurement principle, for example, MICROTRAC UPA (manufactured by Nikkiso Co., Ltd.) is used.

The mass ratio of the content of the phospholipids to the content of the coloring material in the ink is preferably 0.5 or greater and 8.0 or less, more preferably 1.0 or greater and 5.0 or less, still more preferably 1.5 or greater and 4.0 or less, and particularly preferably 2.0 or greater and 3.0 or less.

1.4. Lipid Having Steroid Skeleton

It is preferable that the ink contain lipids having a steroid skeleton. The lipids having a steroid skeleton have a function of filling the gaps in the membranes of the fine particles formed of the phospholipids. Therefore, the membranes of the fine particles have a dense structure. Since the coloring material is protected by the denser membrane, in the recorded material, occurrence of bleeding in the water-soluble coloring material is further suppressed, and the dispersion stability of the fine particles in the water-insoluble coloring material is further improved. Further, the interaction between the coloring material and the metal ions in the ink jet ink composition is further suppressed, and thus discoloration of an image or the like in the recorded material is further suppressed.

It is preferable to use lipids other than the phospholipids and more preferable to use lipids having a steroid skeleton, in order to fill the gaps in the membranes of the fine particles.

Examples of the lipids having a steroid skeleton include animal-based lipids such as cholesterol, cholestanol, and 7-dehydrocholesterol, plant-based lipids such as α-sitosterol, β-sitosterol, γ-sitosterol, stigmasterol, fucosterol, spinasterol, and brassicasterol, a hydrogenated substance of plant-based cholesterol such as phytosterol, and mycelium-based lipids such as ergosterol.

The mass ratio of the content of the phospholipids to the content of the lipids having a steroid skeleton in the ink is preferably 0.5 or greater and 8.0 or less, more preferably 1.0 or greater and 5.0 or less, and still more preferably 1.5 or greater and 3.0 or less. When the mass ratio thereof is greater than or equal to the above-described ranges, the function of the lipids having a steroid skeleton to fill the gaps in the membranes of the fine particles formed of the phospholipids is further improved. When the mass ratio thereof is less than or equal to the above-described ranges, the amount of lipids having a steroid skeleton which are released from the fine particles without filling the gaps in the membranes of the fine particles is reduced. Therefore, the jetting stability of the ink from the ink jet head is improved.

1.5. Cellulose Derivative

It is preferable that the ink contain a cellulose derivative. The cellulose derivative has a function of filling the gaps in the membranes of the fine particles formed of the phospholipids. Therefore, the membranes of the fine particles have a dense structure. Since the coloring material is protected by the denser membrane, in the recorded material, occurrence of bleeding in the water-soluble coloring material is further suppressed, and the dispersion stability of the fine particles in the water-insoluble coloring material is further improved. Further, the interaction between the coloring material and the metal ions in the ink jet ink composition is further suppressed, and thus discoloration of an image or the like in the recorded material is further suppressed.

Examples of the cellulose derivative include methyl cellulose, carboxymethyl cellulose, hydroxyethyl cellulose, and hydroxypropylmethyl cellulose.

The mass ratio of the content of the phospholipids to the content of the cellulose derivative in the ink is preferably 0.5 or greater and 8.0 or less, more preferably 1 or greater and 5 or less, and still more preferably 1.5 or greater and 3.0 or less. When the mass ratio thereof is greater than or equal to the above-described ranges, the function of the cellulose derivative to protect the fine particles is further improved. When the mass ratio thereof is less than or equal to the above-described ranges, the amount of the cellulose derivative to be released from the fine particles without being adsorbed on the surfaces of the fine particles is reduced. Therefore, the jetting stability of the ink from the ink jet head is further improved.

1.6. Carbohydrate

It is preferable that the ink contain carbohydrates. The surfaces of the fine particles are covered with carbohydrates, and the carbohydrates serve as protective colloids. Therefore, the fine particles are unlikely to be aggregated in the ink, and thus the dispersion stability of the fine particles is improved. In this manner, aggregates are unlikely to be formed in the ink, and thus the jetting stability of the ink from the ink jet head is further improved.

Examples of the carbohydrates include tri- or higher saccharides such as raffinose, stachyose, dextrin, starch, and cellulose, sugar alcohol of monosaccharides such as erythritol, xylitol, sorbitol, and mannitol, sugar alcohol of disaccharides such as reduced malt sugar syrup, reduced sugar syrup, and lactitol, artificial sweeteners such as saccharin, sucralose, aspartame, acesulfame potassium, and neotame, natural sweeteners such as stevia and glycyrrhizin, monosaccharides such as glucose, fructose, and galactose, and disaccharides such as maltose and sucrose.

The mass ratio of the content of the phospholipids to the content of the carbohydrates in the ink is preferably 0.5 or greater and 5.0 or less, more preferably 1.0 or greater and 4.0 or less, and still more preferably 2.0 or greater and 3.0 or less. When the mass ratio thereof is 0.5 or greater, the dispersion stability of the fine particles is further improved. When the mass ratio thereof is 5.0 or less, the amount of carbohydrates to be released from the fine particles without covering the surfaces of the fine particles is reduced. Therefore, the jetting stability of the ink from the ink jet head is further improved.

1.7. Organic Solvent

The ink may contains an organic solvent. When the ink contains an organic solvent, the physical properties of the ink such as the viscosity and the surface tension, and the behaviors such as drying and permeation of the organic solvent when the recording medium is coated with the organic solvent can be controlled. Examples of the organic solvent include 2-pyrrolidones, 1,2-alkanediols, polyhydric alcohols, and glycol ethers. Among these, one or more kinds thereof may be used.

2-Pyrrolidones suppress an increase in ink thickening and improve the jetting stability of the ink from the ink jet head. The 2-pyrrolidones denote compounds having a 2-pyrrolidone skeleton. Examples of the 2-pyrrolidones include 2-pyrrolidone having a substituent such as N-methyl-2-pyrrolidone, N-ethyl-2-pyrrolidone, or N-vinyl-2-pyrrolidone, in addition to 2-pyrrolidone having no substituent. As the substituent in the 2-pyrrolidone skeleton, an organic group having 1 to 5 carbon atoms, such as a saturated or unsaturated hydrocarbon group, is preferable.

The 1,2-alkanediols have an excellent effect of increasing the wettability of the ink so that the recording medium is uniformly wetted with the ink. Examples of the 1,2-alkanediols include 1,2-propanediol, 1,2-butanediol, 1,2-pentanediol, 1,2-hexanediol, and 1,2-octanediol. Among the 1,2-alkanediols, 1,2-alkanediol of an alkane having 5 or more carbon atoms is preferable.

The polyhydric alcohols suppress drying of the ink in a nozzle of an ink jet head. Therefore, clogging of the nozzle or jetting failure of the ink is reduced. Examples of the polyhydric alcohols include ethylene glycol, diethylene glycol, triethylene glycol, propylene glycol, dipropylene glycol, 1,3-propanediol, 1,3-butanediol, 1,3-pentanediol, 1,4-butanediol, 1,5-pentanediol, 1,6-hexanediol, 2,3-butanediol, 3-methyl-1,3-butanediol, 3-methyl-1,5-pentanediol, 2-methyl-1,3-propanediol, 2,2-dimethyl-1,3-propanediol, 2-methyl-2,4-pentanediol, trimethylolpropane, and glycerin. Among the polyhydric alcohols, polyhydric alcohol of an alkane having 4 or less carbon atoms or a condensate in which hydroxyl groups of polyhydric alcohol of an alkane having 4 or less carbon atoms are condensed between molecules is preferable.

The glycol ethers adjust the wettability or the permeation rate of the ink with respect to the recording medium to make the image, the pattern, or the like of the recorded material clear. Examples of the glycol ethers include alkylene glycol monoether and alkylene glycol diether.

Examples of the alkylene glycol monoether include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol monohexyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, and dipropylene glycol monoethyl ether.

Examples of the alkylene glycol diether include ethylene glycol dimethyl ether, ethylene glycol diethyl ether, ethylene glycol dibutyl ether, diethylene glycol dimethyl ether, diethylene glycol diethyl ether, diethylene glycol methyl ethyl ether, diethylene glycol dibutyl ether, diethylene glycol butyl methyl ether, triethylene glycol dimethyl ether, triethylene glycol diethyl ether, triethylene glycol dibutyl ether, triethylene glycol butyl methyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

When the ink contains the organic solvent, the content of the organic solvent is not particularly limited, but is preferably 5% by mass or greater and 40% by mass or less and more preferably 7% by mass or greater and 20% by mass or less.

1.8. Other Components

The ink may contain a surfactant and a chelating agent as other components.

The surfactant decreases the surface tension of the ink so that the wettability of the ink with respect to the recording medium is improved. Examples of the surfactant include an acetylene glycol-based surfactant, a silicone-based surfactant, and a fluorine-based surfactant.

Examples of the acetylene glycol-based surfactant include SURFYNOL (registered trademark) 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all trade names, manufactured by Air Products and Chemicals. Inc.), OLEFINE (registered trademark) B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (all trade names, manufactured by Nissin Chemical Industry Co., Ltd.), and ACETYLENOL (registered trademark) E00, E00P, E40, and E100 (all trade names, manufactured by Kawaken Fine Chemicals. Co., Ltd.).

The silicone-based surfactant is not particularly limited, and a polysiloxane-based compound is used. Examples of the polysiloxane-based compound include a polyether-modified organosiloxane. Examples of a commercially available product of the polyether-modified organosiloxane include BYK (registered trademark)-306, BYK-307, BYK-333, BYK-341, BYK-345, BYK-346, and BYK-348 (all trade names, manufactured by BYK-Chemie GmbH), and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all trade names, manufactured by Shin-Etsu Chemical Co., Ltd.).

It is preferable to use a fluorine-modified polymer as the fluorine-based surfactant, and examples thereof include BYK-340 (trade name, manufactured by BYK-Chemie GmbH).

When the ink contains the surfactant, the content of the surfactant is not particularly limited, but is preferably 0.01% by mass or greater and 2.00% by mass or less with respect to the total mass of the ink.

The chelating agent allows the metal ions mixed into the ink to be subjected to complexation due to the chelate effect and suppresses precipitation of metal salts. When metal salts are precipitated, a problem of clogging or the like of a nozzle of an ink jet head is likely to occur.

Examples of the chelating agent include ethylenediaminetetraacetic acid (EDTA), sodium picolinate, potassium quinolinate, tetrasodium 3-hydroxy-2,2'-iminodisuccinate, methylglycinediacetic acid (MGDA), L-glutamic acid diacetic acid (GLDA), L-aspartic acid diacetic acid (ASDA), hydroxyethyliminodiacetic acid (HIDA), 3-hydroxy-2,2'-iminodisuccinic acid (HIDS), dicarboxymethyl glutamic acid (CMGA), (S,S)-ethylenediamine disuccinic acid (EDDS), and salts thereof. Examples of the salts of the chelating agents include salts of ammonium and amine in addition to metal salts such as sodium, potassium, and lithium.

When the ink contains the chelating agent, the content of the chelating agent is not particularly limited, but is preferably 0.01% by mass or greater and 2.00% by mass or less with respect to the total mass of the ink.

Various additives such as a resin emulsion, a preservative, a fungicide, an antioxidant, and a pH adjuster may be added to the ink, in addition to the components described above. Known additives may be employed as such additives.

2. Method of Adjusting Ink

The ink is prepared by preparing a dispersion of fine particles using the above-described method and mixing the above-described components in optional order. Thereafter, impurities, foreign matter, and the like are removed by performing filtration or the like as necessary. As a method of mixing the components, a method of sequentially adding the materials to a container provided with a stirring device such as a mechanical stirrer or a magnetic stirrer, stirring the materials, and mixing the mixture is used. A known method such as centrifugal filtration or filter filtration can be employed as a filtration method.

3. Physical Properties of Ink

The surface tension of the ink at 25° C. is preferably 10 mN/m or greater and 40 mN/m or less and more preferably 20 mN/m or greater and 40 mN/m or less. In this manner, the jetting stability of the ink from the ink jet head is improved. Further, the image formed on the recording medium can be made to have a high definition. The surface tension of the ink can be measured using an automatic surface tensiometer CBVP-Z (manufactured by Kyowa Interface Science Co., Ltd.).

From the same viewpoint as the viewpoint of the surface tension, the viscosity of the ink at 20° C. is preferably 2 mPas (millipascal seconds) or greater and 15 mPas or less and more preferably 2 mPas or greater and 5 mPas or less. The viscosity of the ink can be measured using a viscoelasticity tester MCR-300 (manufactured by Physica). Specifically, the viscosity of the ink at 20° C. is acquired by adjusting the temperature of the ink to 20° C., increasing the shear rate to 10 from 1000, and reading the viscosity at which the shear rate reaches 200.

4. Ink Jet Recording Device

A recording device including an ink jet head used for the recording method of the present embodiment will be described. A known device such as an ink jet printer can be employed as the recording device, and specific examples thereof include an on-carriage type serial printer or an off-carriage type serial printer, and a line head printer.

The ink jet head jets liquid droplets of the ink and allows the ink to adhere to the recording medium. The ink jet head includes an actuator serving as a driving unit. Examples of the actuator include a piezoelectric element that uses deformation of a piezoelectric material, an electromechanical conversion element that uses displacement of a vibration plate due to electrostatic adsorption, and a thermoelectric conversion element that uses bubbles generated by heating. In the present embodiment, a recording device including an ink jet head that is provided with a piezoelectric element is used.

5. Recording Medium

The recording medium is appropriately selected depending on the applications and the kind of ink. Examples of the recording medium include plain paper such as electrophotographic paper, papers such as exclusive paper for ink jet, art paper, coated paper, and cast paper, a permeable recording medium such as a fabric that uses natural fibers or chemical fibers, a resin film or a resin plate such as polyvinyl chloride, polyethylene, polypropylene, or polyethylene terephthalate, a plate made of a metal or an alloy of iron, silver, copper, or aluminum, a plate of an inorganic material such as glass or ceramics, and an impermeable recording medium such as a resin film on which a thin film of an inorganic material containing a metal or the like has been formed on the surface thereof. Since the ink of the present embodiment is an aqueous ink, the ink is suitable for the permeable recording medium described above. Examples of the form of the recording medium include a roll form, a cut form, and a form that has been cut into a predetermined shape.

6. Recording Method

A recording method according to the present embodiment includes a coating step of allowing the ink of the present embodiment to be jetted from the ink jet head to adhere to the recording medium using the recording device described above.

In the coating step, the recording medium is coated with liquid droplets of the ink jetted from the ink jet head of the recording device. Here, a predetermined mass of the liquid droplets of the ink are allowed to adhere to a predetermined position of the recording medium. In this manner, the recording medium is coated with the liquid droplets of the ink to form designs of desired images, characters, patterns, hues, and the like.

The recording method may include a drying step after the coating step. In the drying step, the ink adhered to the recording medium is dried to evaporate volatile components such as water and an organic solvent. Examples of the drying method include a method of using a heat source such as wind or infrared rays in addition to a method of allowing the ink to stand. In this manner, a recorded material is produced.

In the recording method of the present embodiment, since the ink described above is employed, the image quality of the recorded material is improved. Further, the jetting stability of the ink from the ink jet head is improved, and thus the productivity of the recorded material is excellent.

7. Recorded Material

The recorded material according to the present embodiment is formed by allowing the ink to adhere to the recording medium using the recording method as described above. Examples of the recorded material also include recorded materials obtained by performing post-processing such as trimming, laminating, bookbinding, and eyelet processing. According to this, a recorded material with an improved image quality, for example, improved bleeding or color development, can be provided.

8. Examples and Comparative Examples

Hereinafter, the effects of the present disclosure will be described in more detail with reference to examples and comparative examples. Examples 1 to 20 and Comparative Examples 1 to 4 show the levels at which water-soluble coloring materials are used. Hereinafter, such levels will also be referred to as the examples and the comparative examples of the water-soluble coloring materials. Examples 21 to 50 and Comparative Examples 5 to 12 show the levels at which water-insoluble coloring materials are used. Hereinafter, such levels will also be referred to as the examples and the comparative examples of the water-insoluble coloring materials.

The compositions and various factors of inks of the examples and the comparative examples of the water-soluble coloring materials are listed in Tables 1 and 2, and the evaluation results are listed in Tables 3 and 4. The compositions and various factors of inks of the examples and the comparative examples of the water-insoluble coloring materials are listed in Tables 5 to 7, and the evaluation results are listed in Tables 8 to 11. In the columns of the composition of Tables 1, 2, 5, 6, and 7, the numerical values are in units of % by mass, and the columns of "-" denote that the corresponding component is not contained, unless otherwise specified. Further, abbreviations are used as the names of some components. The abbreviations will be described below.

Hereinafter, the inks of Examples 1 to 50 will also be collectively referred to as the ink of the examples, the inks of Comparative Examples 1 to 12 will also be collectively referred to as the ink of the comparative examples, and the inks of the examples and the comparative examples will also be simply referred to as the ink. Further, the present disclosure is not limited to the examples described below.

8.1. Preparation of Ink

Each ink was prepared with the composition listed in Table 1, 2, and 4 to 6. In the inks for which phospholipids were used, first, each ink was prepared after a dispersion of fine particles formed by incorporation of the coloring material in the phospholipids was prepared by the above-described method.

In the inks for which the phospholipids were not used (Comparative Examples 1 to 3 and 5 to 8), the inks were directly prepared without performing the step of preparing a dispersion. That is, the respective components listed in the tables were mixed to prepare the inks. In Comparative Examples 4 and 9 to 12, the phospholipids were used, but the step of preparing a dispersion obtained by incorporation of the coloring material in the phospholipids described above was not performed. That is, the inks were prepared by mixing the respective components listed in the tables. The inks did not contain a dispersion obtained by incorporation of the coloring material in the phospholipids.

TABLE 1

| | | Example 1 | Example 2 | Example 3 | Example 4 | Example 5 | Example 6 | Example 7 |
|---|---|---|---|---|---|---|---|---|
| Water-soluble coloring material (dye) | C.I. Direct Blue 86 | 4.0 | — | — | — | — | — | — |
| | C.I. Direct Red 81 | — | 4.0 | — | — | — | — | — |
| | C.I. Direct Yellow 132 | — | — | 4.0 | — | — | — | — |
| Water-soluble coloring material (dye) derived from animal or plant | Cochineal coloring agent (tin mordanting) | — | — | — | 4.0 | 4.0 | 4.0 | 4.0 |
| | Cochineal coloring agent | — | — | — | — | — | — | — |
| | Gardenia yellow coloring agent | — | — | — | — | — | — | — |
| | Gardenia blue coloring agent | — | — | — | — | — | — | — |
| Phospholipid | Phosphatidylcholine | 8.0 | 8.0 | 8.0 | 8.0 | 8.0 | 8.0 | 8.0 |
| | Phosphatidylcholine (hydrogenated product) | — | — | — | — | — | — | — |
| Lipid having steroid skeleton | Cholesterol | 4.0 | 4.0 | 4.0 | 4.0 | 4.0 | 4.0 | 8.0 |
| | β-Sitosterol | — | — | — | — | — | — | — |
| Lipid (without steroid skeleton) | Triacylglycerol | — | — | — | — | — | — | — |
| Carbohydrate | Dextrin | 3.0 | 3.0 | 3.0 | 3.0 | 3.0 | 3.0 | 3.0 |
| Solvent | Glycerin | 10.0 | 10.0 | 10.0 | 10.0 | 10.0 | 10.0 | 10.0 |
| Surfactant | OLEFINE E1010 | 0.5 | 0.5 | 0.5 | 0.5 | 0.5 | 0.5 | 0.5 |
| Chelating agent | Ethylenediamineteteraacetic acid | 0.1 | 0.1 | 0.1 | 0.1 | 0.1 | 0.1 | 0.1 |
| Pure water | | Remaining amount | Remaining amount | Remaining amount | Remaining amount | Remaining amount | Remaining amount | Remaining amount |
| Total | | 100.0 | 100.0 | 100.0 | 100.0 | 100.0 | 100.0 | 100.0 |
| Average particle diameter D50 (nm) of fine particles | | 170 | 170 | 170 | 170 | 80 | 250 | 170 |
| Mass ratio of content of phospholipid to content of lipid having steroid skeleton | | 2 | 2 | 2 | 2 | 2 | 2 | 1 |
| Mass ratio of content of phospholipid to content of carbohydrate | | 2.7 | 2.7 | 2.7 | 2.7 | 2.7 | 2.7 | 2.7 |

| | | Example 8 | Example 9 | Example 10 | Example 11 | Example 12 |
|---|---|---|---|---|---|---|
| Water-soluble coloring material (dye) | C.I. Direct Blue 86 | — | — | — | — | — |
| | C.I. Direct Red 81 | — | — | — | — | — |
| | C.I. Direct Yellow 132 | — | — | — | — | — |
| Water-soluble coloring material (dye) derived | Cochineal coloring agent (tin mordanting) | 4.0 | 4.0 | — | — | — |

TABLE 1-continued

| | | | | | | |
|---|---|---|---|---|---|---|
| from animal or plant | Cochineal coloring agent | — | — | 4.0 | — | — |
| | Gardenia yellow coloring agent | — | — | — | 4.0 | — |
| | Gardenia blue coloring agent | — | — | — | — | 4.0 |
| Phospholipid | Phosphatidylcholine | 8.0 | 8.0 | 8.0 | 8.0 | 8.0 |
| | Phosphatidylcholine (hydrogenated product) | — | — | — | — | — |
| Lipid having steroid skeleton | Cholesterol | 1.6 | — | 4.0 | 4.0 | 4.0 |
| | β-Sitosterol | — | 4.0 | — | — | — |
| Lipid (without steroid skeleton) | Triacylglycerol | — | — | — | — | — |
| Carbohydrate | Dextrin | 3.0 | 3.0 | 3.0 | 3.0 | 3.0 |
| Solvent | Glycerin | 10.0 | 10.0 | 10.0 | 10.0 | 10.0 |
| Surfactant | OLEFINE E1010 | 0.5 | 0.5 | 0.5 | 0.5 | 0.5 |
| Chelating agent | Ethylenediamineteteraacetic acid | 0.1 | 0.1 | 0.1 | 0.1 | 0.1 |
| Pure water | | Remaining amount | Remaining amount | Remaining amount | Remaining amount | Remaining amount |
| Total | | 100.0 | 100.0 | 100.0 | 100.0 | 100.0 |
| Average particle diameter D50 (nm) of fine particles | | 170 | 250 | 170 | 170 | 170 |
| Mass ratio of content of phospholipid to content of lipid having steroid skeleton | | 5 | 2 | 2 | 2 | 2 |
| Mass ratio of content of phospholipid to content of carbohydrate | | 2.7 | 2.7 | 2.7 | 2.7 | 2.7 |

TABLE 2

| | | Example 13 | Example 14 | Example 15 | Example 16 | Example 17 | Example 18 | Example 19 |
|---|---|---|---|---|---|---|---|---|
| Water-soluble coloring material (dye) | C.I. Direct Blue 86 | — | — | — | — | — | — | — |
| | C.I. Direct Red 81 | — | — | — | — | — | — | — |
| | C.I. Direct Yellow 132 | — | — | — | — | — | — | — |
| Water-soluble coloring material (dye) derived from animal or plant | Cochineal coloring agent (tin mordanting) | 4.0 | 4.0 | 4.0 | 4.0 | 4.0 | 4.0 | 4.0 |
| | Cochineal coloring agent | — | — | — | — | — | — | — |
| | Gardenia yellow coloring agent | — | — | — | — | — | — | — |
| | Gardenia blue coloring agent | — | — | — | — | — | — | — |
| Phospholipid | Phosphatidylcholine | 8.0 | — | 8.0 | 8.0 | 8.0 | 8.0 | 8.0 |
| | Phosphatidylcholine (hydrogenated product) | — | 8.0 | — | — | — | — | — |
| Lipid having steroid skeleton | Cholesterol | 4.0 | 4.0 | 4.0 | 4.0 | 16.0 | 1.0 | — |
| | β-Sitosterol | — | — | — | — | — | — | — |
| Lipid (without steroid skeleton) | Triacylglycerol | — | — | — | — | — | — | — |
| Carbohydrate | Dextrin | — | 3.0 | 3.0 | 3.0 | 3.0 | 3.0 | 3.0 |
| Solvent | Glycerin | 10.0 | 10.0 | 10.0 | 10.0 | 10.0 | 10.0 | 10.0 |
| Surfactant | OLEFINE E1010 | 0.5 | 0.5 | 0.5 | 0.5 | 0.5 | 0.5 | 0.5 |
| Chelating agent | Ethylenediamineteteraacetic acid | 0.1 | 0.1 | 0.1 | 0.1 | 0.1 | 0.1 | 0.1 |
| Pure water | | Remaining amount | Remaining amount | Remaining amount | Remaining amount | Remaining amount | Remaining amount | Remaining amount |
| Total | | 100.0 | 100.0 | 100.0 | 100.0 | 100.0 | 100.0 | 100.0 |
| Average particle diameter D50 (nm) of fine particles | | 170 | 250 | 50 | 350 | 170 | 170 | 170 |
| Mass ratio of content of phospholipid to content of lipid having steroid skeleton | | 2 | 2 | 2 | 2 | 0.5 | 8 | — |
| Mass ratio of content of phospholipid to content of carbohydrate | | — | 2.7 | 2.7 | 2.7 | 2.7 | 2.7 | 2.7 |

| | | Example 20 | Comparative Example 1 | Comparative Example 2 | Comparative Example 3 | Comparative Example 4 |
|---|---|---|---|---|---|---|
| Water-soluble coloring material (dye) | C.I. Direct Blue 86 | — | 4.0 | — | — | — |
| | C.I. Direct Red 81 | — | — | — | — | — |
| | C.I. Direct Yellow 132 | — | — | — | — | — |
| Water-soluble coloring material (dye) derived from animal or plant | Cochineal coloring agent (tin mordanting) | 4.0 | — | — | 4.0 | 4.0 |
| | Cochineal coloring agent | — | — | — | — | — |
| | Gardenia yellow coloring agent | — | — | — | — | — |
| | Gardenia blue coloring agent | — | — | 8.0 | — | — |
| Phospholipid | Phosphatidylcholine | 8.0 | — | — | — | 8.0 |
| | Phosphatidylcholine (hydrogenated product) | — | — | — | — | — |
| Lipid having steroid skeleton | Cholesterol | — | — | — | — | 4.0 |
| | β-Sitosterol | — | — | — | — | — |
| Lipid (without steroid skeleton) | Triacylglycerol | 4.0 | — | — | — | — |

TABLE 2-continued

| | | | | | | |
|---|---|---|---|---|---|---|
| Carbohydrate | Dextrin | 3.0 | 3.0 | 3.0 | 3.0 | 3.0 |
| Solvent | Glycerin | 10.0 | 10.0 | 10.0 | 10.0 | 10.0 |
| Surfactant | OLEFINE E1010 | 0.5 | 0.5 | 0.5 | 0.5 | 0.5 |
| Chelating agent | Ethylenediamineteteraacetic acid | 0.1 | 0.1 | 0.1 | 0.1 | 0.1 |
| Pure water | | Remaining amount | Remaining amount | Remaining amount | Remaining amount | Remaining amount |
| Total | | 100.0 | 100.0 | 100.0 | 100.0 | 100.0 |
| Average particle diameter D50 (nm) of fine particles | | 300 | — | — | — | 170 |
| Mass ratio of content of phospholipid to content of lipid having steroid skeleton | | — | — | — | — | 2 |
| Mass ratio of content of phospholipid to content of carbohydrate | | 2.7 | 0.0 | 0.0 | 0.0 | 2.7 |

TABLE 3

| | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| Bleeding of recorded material | A | A | A | A | A | A | A | A | B | A | A | A |
| Color developability of recorded material | AA | AA | AA | AA | B | AA | AA | AA | AA | A | AA | A |
| Discoloration of recorded material | A | A | A | A | A | A | A | A | A | A | AA | AA |
| Jetting stability of ink | AA | AA | AA | AA | AA | A | A | A | A | AA | AA | AA |

TABLE 4

| | Example 13 | Example 14 | Example 15 | Example 16 | Example 17 | Example 18 | Example 19 | Example 20 | Comparative Example 1 | Comparative Example 2 | Comparative Example 3 | Comparative Example 4 |
|---|---|---|---|---|---|---|---|---|---|---|---|---|
| Bleeding of recorded material | A | A | A | A | A | B | C | C | D | D | D | D |
| Color developability of recorded material | AA | AA | B | A | A | A | B | C | AA | A | C | C |
| Discoloration of recorded material | A | A | A | A | A | A | B | C | A | A | C | C |
| Jetting stability of ink | A | AA | B | B | B | A | C | C | AA | AA | C | C |

TABLE 5

| | | Example 21 | Example 22 | Example 23 | Example 24 | Example 25 | Example 26 | Example 27 |
|---|---|---|---|---|---|---|---|---|
| Dispersed dye | C.I. Disperse Blue 360 | — | — | — | — | — | — | — |
| | C.I. Disperse Red 60 | — | — | — | — | — | — | — |
| | C.I. Disperse Yellow 54 | — | — | — | — | — | — | — |
| Leuco dye | S-205 | — | — | — | — | — | — | — |
| | Bisphenol A (color developer) | — | — | — | — | — | — | — |
| Water-insoluble coloring material derived from animal or plant | Lac coloring agent | 4.0 | — | — | — | — | — | — |
| | Turmeric coloring agent | — | 4.0 | 4.0 | 4.0 | 4.0 | 4.0 | — |
| | Indian indigo | — | — | — | — | — | — | 4.0 |
| | Bincho charcoal | — | — | — | — | — | — | — |
| Phospholipid | Phosphatidylcholine | 8.0 | 8.0 | 8.0 | 8.0 | 8.0 | 8.0 | 8.0 |
| Lipid having steroid skeleton | Cholesterol | 4.0 | 4.0 | — | — | — | 4.0 | 4.0 |
| | β-Sitosterol | — | — | 4.0 | — | — | — | — |

TABLE 5-continued

| | | | | | | | | |
|---|---|---|---|---|---|---|---|---|
| Lipid (without steroid skeleton) | Triacylglycerol | — | — | — | 4.0 | — | — | — |
| Cellulose derivative | Methyl cellulose | — | — | — | — | — | — | — |
| Carbohydrate | Dextrin | 3.0 | 3.0 | 3.0 | 3.0 | 3.0 | — | 3.0 |
| Solvent | Glycerin | 10.0 | 10.0 | 10.0 | 10.0 | 10.0 | 10.0 | 10.0 |
| Surfactant | OLEFINE E1010 | 0.5 | 0.5 | 0.5 | 0.5 | 0.5 | 0.5 | 0.5 |
| Chelating agent | Ethylenediamineteteraacetic acid | 0.1 | 0.1 | 0.1 | 0.1 | 0.1 | 0.1 | 0.1 |
| Pure water | | Remaining amount | Remaining amount | Remaining amount | Remaining amount | Remaining amount | Remaining amount | Remaining amount |
| Total | | 100.0 | 100.0 | 100.0 | 100.0 | 100.0 | 100.0 | 100.0 |
| Average particle diameter D50 (nm) of fine particles | | 170 | 170 | 250 | 250 | 170 | 170 | 170 |
| Mass ratio of content of phospholipid to content of lipid having steroid skeleton | | 2 | 2 | 2 | — | — | 2 | 2 |
| Mass ratio of content of phospholipid to content of cellulose derivative | | — | — | — | — | — | — | — |
| Mass ratio of content of phospholipid to content of carbohydrate | | 2.7 | 2.7 | 2.7 | 2.7 | 2.7 | — | 2.7 |

| | | Example 28 | Example 29 | Example 30 | Example 31 | Example 32 | Example 33 |
|---|---|---|---|---|---|---|---|
| Dispersed dye | C.I. Disperse Blue 360 | — | — | — | 4.0 | — | — |
| | C.I. Disperse Red 60 | — | — | — | — | 4.0 | — |
| | C.I. Disperse Yellow 54 | — | — | — | — | — | 4.0 |
| Leuco dye | S-205 | 4.0 | 4.0 | 4.0 | — | — | — |
| | Bisphenol A (color developer) | 4.0 | 4.0 | 4.0 | — | — | — |
| Water-insoluble coloring material derived from animal or plant | Lac coloring agent | — | — | — | — | — | — |
| | Turmeric coloring agent | — | — | — | — | — | — |
| | Indian indigo | — | — | — | — | — | — |
| | Bincho charcoal | — | — | — | — | — | — |
| Phospholipid | Phosphatidylcholine | 8.0 | 8.0 | 8.0 | 8.0 | 8.0 | 8.0 |
| Lipid having steroid skeleton | Cholesterol | 4.0 | — | — | 4.0 | 4.0 | 4.0 |
| | β-Sitosterol | — | — | — | — | — | — |
| Lipid (without steroid skeleton) | Triacylglycerol | — | — | — | — | — | — |
| Cellulose derivative | Methyl cellulose | — | 4.0 | — | — | — | — |
| Carbohydrate | Dextrin | 3.0 | 3.0 | 3.0 | 3.0 | 3.0 | 3.0 |
| Solvent | Glycerin | 10.0 | 10.0 | 10.0 | 10.0 | 10.0 | 10.0 |
| Surfactant | OLEFINE E1010 | 0.5 | 0.5 | 0.5 | 0.5 | 0.5 | 0.5 |
| Chelating agent | Ethylenediamineteteraacetic acid | 0.1 | 0.1 | 0.1 | 0.1 | 0.1 | 0.1 |
| Pure water | | Remaining amount | Remaining amount | Remaining amount | Remaining amount | Remaining amount | Remaining amount |
| Total | | 100.0 | 100.0 | 100.0 | 100.0 | 100.0 | 100.0 |
| Average particle diameter D50 (nm) of fine particles | | 170 | 170 | 170 | 170 | 170 | 170 |
| Mass ratio of content of phospholipid to content of lipid having steroid skeleton | | 2 | — | — | 2 | 2 | 2 |
| Mass ratio of content of phospholipid to content of cellulose derivative | | — | 2 | — | — | — | — |
| Mass ratio of content of phospholipid to content of carbohydrate | | 2.7 | 2.7 | 2.7 | 2.7 | 2.7 | 2.7 |

The abbreviations and the details of the components used in Tables 1, 2, and 4 to 6 are as follows.

Water-Soluble Dyes

Tin mordanting of cochineal coloring agent: sodium stannate trihydrate, manufactured by FUJIFILM Wako Pure Chemical Corporation Cochineal coloring agent: Carmine Red, manufactured by Kiriya Chemicals Co., Ltd.

Gardenia yellow coloring agent: Xylene L-150, manufactured by Kiriya Chemicals Co., Ltd.

Gardenia blue coloring agent: Kiriyas Blue EL, manufactured by Kiriya Chemicals Co., Ltd.

Water-Insoluble Coloring Material

S-205 (leuco dye): BD628675, manufactured by BLD Pharmatech Ltd.

Bisphenol A (leuco dye color developer): manufactured by FUJIFILM Wako Pure Chemical Corporation Lac coloring agent: bulk of lac coloring agent, manufactured by Kiriya Chemicals Co., Ltd.

Turmeric coloring agent: bulk of turmeric coloring agent, manufactured by Kiriya Chemicals Co., Ltd.

Indian indigo: bulk of Indian indigo, manufactured by Aikuma Senryo Co., Ltd.

Bincho charcoal, manufactured by Kiriya Chemicals Co., Ltd.

Phospholipids

Phosphatidylcholine (lecithin): made of lecithin powder soybean, manufactured by Nacalai Tesque, Inc.

Phosphatidylcholine (hydrogenated product): LECINOL S-10M, manufactured by Nikko Chemical Co., Ltd.

Lipids Having Steroid Skeleton

Cholesterol: manufactured by FUJIFILM Wako Pure Chemical Corporation

β-Sitosterol: manufactured by FUJIFILM Wako Pure Chemical Corporation

Lipids (without Steroid Skeleton)

Triacylglycerol: manufactured by FUJIFILM Wako Pure Chemical Corporation

Cellulose Derivative

Methyl cellulose: METOLOSE (registered trademark) SM-15, manufactured by Shin-Etsu Chemical Co., Ltd.

Carbohydrates

Dextrin: manufactured by FUJIFILM Wako Pure Chemical Corporation

Surfactants

OLEFINE (registered trademark) E1010: manufactured by Shin-Etsu Chemical Co., Ltd.

8.2. Evaluation

The following evaluations were performed on each ink, and the evaluation results are listed in Tables 3, 4, and 8 to 11. Further, bleeding of the recorded material was evaluated only with the ink containing a water-soluble coloring material.

8.2.1. Preparation of Recorded Material

The recorded materials for evaluation were prepared using each ink by the following procedures. Ink cartridges of an ink jet printer PX-5840 (manufactured by Seiko Epson Corporation) were filled with each ink, and the ink cartridges were mounted on PX-5840. Next, V-paper A4 (manufactured by Fuji Xerox Co., Ltd.) was employed as the recording medium of plain paper, and a recorded material was prepared by printing a solid pattern in which the amount of ink adhered was set to 100% Duty. Here, the image resolution was 1440×720 dpi (dots per inch). % Duty is represented by "% Duty=number of recorded dots per square inch/(1440×720)×100".

8.2.2. Evaluation of Bleeding

The bleeding of the recorded material was evaluated by employing the following method. The recorded material that had been standing for 30 minutes after printing was mounted on a horizontal surface. Thereafter, 0.5 mL of pure water was added dropwise with a spuit to a region where the recorded material was solid-printed. Immediately after the dropwise addition, one side of slide glass was pressed against the vicinity of water droplets on the recorded material, and the slide glass was allowed to slide on the recorded material by approximately 15 cm such that the water droplets moved in one direction. Here, the sliding speed of the slide glass was set to 15 cm for approximately 2 seconds. Thereafter, the boundary of the region where the water droplets moved was visually observed, and the state of bleeding was evaluated based on the following evaluation criteria.

Evaluation Criteria

A: Bleeding was not found in the boundary.

B: Bleeding was found at one or two sites in the boundary.

C: Bleeding was found at three or four sites in the boundary.

D: Bleeding was found at five or more sites in the boundary.

8.2.3. Evaluation of Color Developability

The optical density (OD) value was measured as the index of the color developability of the recorded material. The OD value of the printed region of the solid-printed recorded material was measured under measurement conditions of using a colorimeter i1 (trade name, manufactured by X-Rite Inc.) and a light source D50 without using a light source filter at a viewing angle of 2 degrees, and the evaluation was performed according to the following evaluation criteria. Further, the measurement was carried out approximately 5 minutes or longer after the recording.

AA: The OD value was 1.0 or greater.

A: The OD value was 0.8 or greater and less than 1.0.

B: The OD value was 0.6 or greater and less than 0.8.

C: The OD value was less than 0.6.

8.2.4. Evaluation of Discoloration

The discoloration of the recorded material was evaluated by employing the following method. Two sheets of recorded materials were prepared with a time difference of 1 minute using the method of preparing the recorded material described above. A change in color tone between the printed region of the recorded material immediately after the printing and the printed region of the recorded material one minute after the printing was observed, and the evaluation was performed according to the following evaluation criteria.

A: A change in color tone was not found.

B: A slight change in color tone was found.

C: A clear change in color tone was found.

8.2.5. Evaluation of Jetting Stability

The jetting stability of the ink from the ink jet head was evaluated by continuously preparing 50 sheets of recorded materials using the above-described method of preparing the recorded material and confirming the initial state of nozzles and the state of nozzles after the preparation. Specifically, first, the nozzle check pattern was printed to confirm whether all nozzles jetted the ink normally. Next, 50 sheets of solid-printed recorded materials were continuously prepared. Immediately after the preparation, the nozzle check pattern was printed again. The number of nozzles with ink jetting failure in the nozzle check pattern was investigated, and the evaluation was performed according to the following evaluation criteria.

AA: The number of nozzles with jetting failure was 4 or less.

A: The number of nozzles with jetting failure was 5 or greater and 9 or less.

B: The number of nozzles with jetting failure was 10 or greater and 19 or less.

C: The number of nozzles with jetting failure was 20 or greater.

TABLE 6

| | | Example 34 | Example 35 | Example 36 | Example 37 | Example 38 | Example 39 | Example 40 |
|---|---|---|---|---|---|---|---|---|
| Dispersed dye | C.I. Disperse Blue 360 | — | — | — | — | — | — | — |
| | C.I. Disperse Red 60 | — | — | — | — | — | — | — |
| | C.I. Disperse Yellow 54 | 4.0 | — | — | — | — | — | — |
| Leuco dye | S-205 | — | — | — | — | — | — | — |
| | Bisphenol A (color developer) | — | — | — | — | — | — | — |
| Water-insoluble coloring material derived from animal or plant | Lac coloring agent | — | — | — | — | — | — | — |
| | Turmeric coloring agent | — | — | — | — | 4.0 | 4.0 | 4.0 |
| | Indian indigo | — | — | — | — | — | — | — |
| | Bincho charcoal | — | 4.0 | 4.0 | 4.0 | — | — | — |
| Phospholipid | Phosphatidylcholine | 8.0 | 8.0 | 8.0 | 8.0 | 8.0 | 8.0 | 8.0 |
| Lipid having steroid skeleton | Cholesterol | — | — | 4.0 | — | 4.0 | 4.0 | 4.0 |
| | β-Sitosterol | 4.0 | — | — | 4.0 | — | — | — |

TABLE 6-continued

| | | | | | | | | |
|---|---|---|---|---|---|---|---|---|
| Lipid (without steroid skeleton) | Triacylglycerol | — | — | — | — | — | — | — |
| Cellulose derivative | Methyl cellulose | — | 4.0 | — | — | — | — | — |
| Carbohydrate | Dextrin | 3.0 | 3.0 | 3.0 | 3.0 | 3.0 | 3.0 | 3.0 |
| Solvent | Glycerin | 10.0 | 10.0 | 10.0 | 10.0 | 10.0 | 10.0 | 10.0 |
| Surfactant | OLEFINE E1010 | 0.5 | 0.5 | 0.5 | 0.5 | 0.5 | 0.5 | 0.5 |
| Chelating agent | Ethylenediamineteteraacetic acid | 0.1 | 0.1 | 0.1 | 0.1 | 0.1 | 0.1 | 0.1 |
| Pure water | | Remaining amount | Remaining amount | Remaining amount | Remaining amount | Remaining amount | Remaining amount | Remaining amount |
| Total | | 100.0 | 100.0 | 100.0 | 100.0 | 100.0 | 100.0 | 100.0 |
| Average particle diameter D50 (nm) of fine particles | | 170 | 250 | 250 | 250 | 50 | 80 | 170 |
| Mass ratio of content of phospholipid to content of lipid having steroid skeleton | | 2 | — | 2 | 2 | 2 | 2 | 2 |
| Mass ratio of content of phospholipid to content of cellulose derivative | | — | 2 | — | — | — | — | — |
| Mass ratio of content of phospholipid to content of carbohydrate | | 2.7 | 2.7 | 2.7 | 2.7 | 2.7 | 2.7 | 2.7 |

| | | Example 41 | Example 42 | Example 43 | Example 44 | Example 45 | Example 46 |
|---|---|---|---|---|---|---|---|
| Dispersed dye | C.I. Disperse Blue 360 | — | — | — | — | — | — |
| | C.I. Disperse Red 60 | — | — | — | — | — | — |
| | C.I. Disperse Yellow 54 | — | — | — | — | — | — |
| Leuco dye | S-205 | — | — | — | — | — | — |
| | Bisphenol A (color developer) | — | — | — | — | — | — |
| Water-insoluble coloring material derived from animal or plant | Lac coloring agent | — | — | — | — | — | — |
| | Turmeric coloring agent | 4.0 | 4.0 | 4.0 | 4.0 | 4.0 | 4.0 |
| | Indian indigo | — | — | — | — | — | — |
| | Bincho charcoal | — | — | — | — | — | — |
| Phospholipid | Phosphatidylcholine | 8.0 | 8.0 | 8.0 | 8.0 | 8.0 | 8.0 |
| Lipid having steroid skeleton | Cholesterol | 4.0 | 4.0 | 16.0 | 8.0 | 1.6 | 1.0 |
| | β-Sitosterol | — | — | — | — | — | — |
| Lipid (without steroid skeleton) | Triacylglycerol | — | — | — | — | — | — |
| Cellulose derivative | Methyl cellulose | — | — | — | — | — | — |
| Carbohydrate | Dextrin | 3.0 | 3.0 | 3.0 | 3.0 | 3.0 | 3.0 |
| Solvent | Glycerin | 10.0 | 10.0 | 10.0 | 10.0 | 10.0 | 10.0 |
| Surfactant | OLEFINE E1010 | 0.5 | 0.5 | 0.5 | 0.5 | 0.5 | 0.5 |
| Chelating agent | Ethylenediamineteteraacetic acid | 0.1 | 0.1 | 0.1 | 0.1 | 0.1 | 0.1 |
| Pure water | | Remaining amount | Remaining amount | Remaining amount | Remaining amount | Remaining amount | Remaining amount |
| Total | | 100.0 | 100.0 | 100.0 | 100.0 | 100.0 | 100.0 |
| Average particle diameter D50 (nm) of fine particles | | 250 | 350 | 170 | 170 | 170 | 170 |
| Mass ratio of content of phospholipid to content of lipid having steroid skeleton | | 2 | 2 | 0.5 | 1 | 5 | 8 |
| Mass ratio of content of phospholipid to content of cellulose derivative | | — | — | — | — | — | — |
| Mass ratio of content of phospholipid to content of carbohydrate | | 2.7 | 2.7 | 2.7 | 2.7 | 2.7 | 2.7 |

TABLE 7

| | | Example 47 | Example 48 | Example 49 | Example 50 | Comparative Example 5 | Comparative Example 6 | Comparative Example 7 |
|---|---|---|---|---|---|---|---|---|
| Dispersed dye | C.I. Disperse Blue 360 | — | — | — | — | — | — | 4.0 |
| | C.I. Disperse Red 60 | — | — | — | — | — | — | — |
| | C.I. Disperse Yellow 54 | — | — | — | — | — | — | — |
| Leuco dye | S-205 | — | — | — | — | — | 4.0 | — |
| | Bisphenol A (color developer) | — | — | — | — | — | 4.0 | — |
| Water-insoluble coloring material derived from animal or plant | Lac coloring agent | — | — | — | — | — | — | — |
| | Turmeric coloring agent | 4.0 | 4.0 | 4.0 | 4.0 | 4.0 | — | — |
| | Indian indigo | — | — | — | — | — | — | — |
| | Bincho charcoal | — | — | — | — | — | — | — |
| Phospholipid | Phosphatidylcholine | 8.0 | 8.0 | 8.0 | 8.0 | — | — | — |
| Lipid having steroid skeleton | Cholesterol | — | — | — | — | — | — | — |
| | β-Sitosterol | — | — | — | — | — | — | — |
| Lipid (without steroid skeleton) | Triacylglycerol | — | — | — | — | — | — | — |
| Cellulose derivative | Methyl cellulose | 16.0 | 8.0 | 1.6 | 1.0 | — | — | — |
| Carbohydrate | Dextrin | 3.0 | 3.0 | 3.0 | 3.0 | 3.0 | 3.0 | 3.0 |
| Solvent | Glycerin | 10.0 | 10.0 | 10.0 | 10.0 | 10.0 | 10.0 | 10.0 |
| Surfactant | OLEFINE E1010 | 0.5 | 0.5 | 0.5 | 0.5 | 0.5 | 0.5 | 0.5 |
| Chelating agent | Ethylenediamineteteraacetic acid | 0.1 | 0.1 | 0.1 | 0.1 | 0.1 | 0.1 | 0.1 |

TABLE 7-continued

| | | | | | | | |
|---|---|---|---|---|---|---|---|
| Pure water | Remaining amount | Remaining amount | Remaining amount | Remaining amount | Remaining amount | Remaining amount | Remaining amount |
| Total | 100.0 | 100.0 | 100.0 | 100.0 | 100.0 | 100.0 | 100.0 |
| Average particle diameter D50 (nm) of fine particles | 170 | 170 | 170 | 170 | — | — | — |
| Mass ratio of content of phospholipid to content of lipid having steroid skeleton | — | — | — | — | — | — | — |
| Mass ratio of content of phospholipid to content of cellulose derivative | 0.5 | 1 | 5 | 8 | — | — | — |
| Mass ratio of content of phospholipid to content of carbohydrate | 2.7 | 2.7 | 2.7 | 2.7 | 0.0 | 0.0 | 0.0 |

| | | Comparative Example 8 | Comparative Example 9 | Comparative Example 10 | Comparative Example 11 | Comparative Example 12 |
|---|---|---|---|---|---|---|
| Dispersed dye | C.I. Disperse Blue 360 | — | — | — | 4.0 | — |
| | C.I. Disperse Red 60 | — | — | — | — | — |
| | C.I. Disperse Yellow 54 | — | — | — | — | — |
| Leuco dye | S-205 | — | — | 4.0 | — | — |
| | Bisphenol A (color developer) | — | — | 4.0 | — | — |
| Water-insoluble coloring material derived from animal or plant | Lac coloring agent | — | — | — | — | — |
| | Turmeric coloring agent | — | 4.0 | — | — | — |
| | Indian indigo | — | — | — | — | — |
| | Bincho charcoal | 4.0 | — | — | — | 4.0 |
| Phospholipid | Phosphatidylcholine | — | 8.0 | 8.0 | 8.0 | 8.0 |
| Lipid having steroid skeleton | Cholesterol | — | 4.0 | — | 4.0 | — |
| | β-Sitosterol | — | — | — | — | — |
| Lipid (without steroid skeleton) | Triacylglycerol | — | — | — | — | — |
| Cellulose derivative | Methyl cellulose | — | — | 4.0 | — | 4.0 |
| Carbohydrate | Dextrin | 3.0 | 3.0 | 3.0 | 3.0 | 3.0 |
| Solvent | Glycerin | 10.0 | 10.0 | 10.0 | 10.0 | 10.0 |
| Surfactant | OLEFINE E1010 | 0.5 | 0.5 | 0.5 | 0.5 | 0.5 |
| Chelating agent | Ethylenediamineteteraacetic acid | 0.1 | 0.1 | 0.1 | 0.1 | 0.1 |
| Pure water | | Remaining amount | Remaining amount | Remaining amount | Remaining amount | Remaining amount |
| Total | | 100.0 | 100.0 | 100.0 | 100.0 | 100.0 |
| Average particle diameter D50 (nm) of fine particles | | — | 170 | 170 | 170 | 170 |
| Mass ratio of content of phospholipid to content of lipid having steroid skeleton | | — | 1 | — | 1 | — |
| Mass ratio of content of phospholipid to content of cellulose derivative | | — | — | 1 | — | 1 |
| Mass ratio of content of phospholipid to content of carbohydrate | | 0.0 | 2.7 | 2.7 | 2.7 | 2.7 |

TABLE 8

| | Example 21 | Example 22 | Example 23 | Example 24 | Example 25 | Example 26 | Example 27 | Example 28 | Example 29 | Example 30 |
|---|---|---|---|---|---|---|---|---|---|---|
| Color developability of recorded material | AA | AA | AA | B | B | AA | AA | A | AA | B |
| Discoloration of recorded material | A | A | A | B | B | A | A | A | A | B |
| Jetting stability of ink | AA | AA | A | B | B | A | AA | AA | AA | B |

TABLE 9

| | Example 31 | Example 32 | Example 33 | Example 34 | Example 35 | Example 36 | Example 37 | Example 38 | Example 39 | Example 40 |
|---|---|---|---|---|---|---|---|---|---|---|
| Color developability of recorded material | AA | AA | AA | AA | AA | AA | AA | A | A | AA |

TABLE 9-continued

| | Example 31 | Example 32 | Example 33 | Example 34 | Example 35 | Example 36 | Example 37 | Example 38 | Example 39 | Example 40 |
|---|---|---|---|---|---|---|---|---|---|---|
| Discoloration of recorded material | A | A | A | A | A | A | A | A | A | A |
| Jetting stability of ink | AA | AA | AA | A | AA | AA | A | A | AA | AA |

TABLE 10

| | Example 41 | Example 42 | Example 43 | Example 44 | Example 45 | Example 46 | Example 47 | Example 48 | Example 49 | Example 50 |
|---|---|---|---|---|---|---|---|---|---|---|
| Color developability of recorded material | AA | A | A | AA | AA | A | A | AA | AA | A |
| Discoloration of recorded material | A | A | A | A | A | A | A | A | A | A |
| Jetting stability of ink | AA | B | A | AA | A | B | A | AA | A | B |

TABLE 11

| | Comparative Example 5 | Comparative Example 6 | Comparative Example 7 | Comparative Example 8 | Comparative Example 9 | Comparative Example 10 | Comparative Example 11 | Comparative Example 12 |
|---|---|---|---|---|---|---|---|---|
| Color developability of recorded material | C | C | C | C | B | B | B | B |
| Discoloration of recorded material | C | C | B | B | C | C | B | B |
| Jetting stability of ink | C | C | C | C | C | C | C | C |

8.3. Summary of Evaluation Results 8.3.1. Water-Soluble Coloring Material

As listed in Tables 3 and 4, in the examples of the water-soluble coloring materials, the bleeding was evaluated as C or higher as the evaluation result in all levels of Examples 1 to 20. Particularly, in Examples 1 to 18, the bleeding was evaluated as B in Examples 9 and 18 and evaluated as A in other examples. Therefore, it was found that the bleeding of the recorded material was improved in the examples of the water-soluble coloring material.

The color developability was evaluated as B or higher in Examples 1 to 19. Particularly, the color developability was evaluated as A or higher except for Examples 5, 15, and 19 and evaluated as AA in Examples 1 to 4, Examples 6 to 9, and Examples 11, 13, and 14. Therefore, it was found that the color developability of the recorded material was improved in the examples of the water-soluble coloring material.

The discoloration was evaluated as B or higher in Examples 1 to 19. Particularly, the discoloration was evaluated as A or higher in Examples 1 to 18. Therefore, it was found that the recorded material was unlikely to be discolored in the examples of the water-soluble coloring material.

The jetting stability was evaluated as B or higher in Examples 1 to 18. Particularly, the jetting stability was evaluated as A or higher except for Examples 15, 16, and 17. Therefore, it was found that the jetting stability of the ink was improved in the examples of the water-soluble coloring material.

On the contrary, the bleeding was evaluated as D as the evaluation result in all the comparative examples of the water-soluble coloring material, and thus it was found that bleeding was likely to occur in the recorded material. Further, all the color developability, the discoloration, and the jetting stability were evaluated as C as the evaluation results in Comparative Examples 3 and 4, and thus it was found that these characteristics were difficult to improve.

8.3.2. Water-Insoluble Coloring Material

As listed in Tables 8 to 10, in the examples of the water-insoluble coloring materials, the color developability was evaluated as B or higher as the evaluation result in all levels of Examples 21 to 50. Particularly, the color developability was evaluated as A or higher except for Examples 24, 25, and 30. Therefore, it was found that the color developability of the recorded material was improved in the examples of the water-insoluble coloring material.

The discoloration was evaluated as B or higher in all levels of Examples 21 to 50. Particularly, the discoloration was evaluated as A or higher except for Examples 24, 25, and 30. Therefore, it was found that the recorded material was unlikely to be discolored in the examples of the water-insoluble coloring material.

The jetting stability was evaluated as B or higher in Examples 21 to 50. Particularly, the jetting stability was evaluated as A or higher except for Examples 24, 25, 30, 42, 46, and 50. Therefore, it was found that the jetting stability of the ink was improved in the examples of the water-insoluble coloring material.

On the contrary, the color developability was evaluated as B or less as the evaluation result in all the comparative examples of the water-insoluble coloring material as listed in Table 11, and thus it was found that the color developability of the recorded material was difficult to improve. Further, the discoloration was evaluated as B or less as the evaluation result in all the comparative examples of the water-insoluble coloring material, and thus it was found that the discoloration of the recorded material was likely to occur. Further, the jetting stability of the ink was evaluated as C in all the comparative examples of the water-insoluble coloring material, and thus it was found that the jetting stability was degraded as compared to the examples of the water-insoluble coloring material.

What is claimed is:

1. An ink jet ink composition configured to be jetted from an ink jet head to a recording medium, the ink jet ink composition comprising:

water;

a phospholipid that forms a fine particle;

a cellulose derivative; and a coloring material that is incorporated in the fine particle, wherein the coloring material is a water-insoluble coloring material that is a pigment derived from an animal or a plant; and wherein a mass ratio of a content of the phospholipid to a content of the cellulose derivative is 0.5 or greater and 3 or less.

2. The ink jet ink composition according to claim 1, wherein the coloring material is a water-insoluble coloring material that is a pigment derived from a plant.

3. The ink jet ink composition according to claim 1, further comprising:

a lipid that has a steroid skeleton.

4. The ink jet ink composition according to claim 3, wherein a mass ratio of a content of the phospholipid to a content of the lipid having a steroid skeleton is 1 or greater and 5 or less.

5. The ink jet ink composition according to claim 1, wherein the fine particle is a bimolecular membrane associated with the phospholipid.

6. The ink jet ink composition according to claim 1, wherein an average particle diameter D50 of the fine particles is 80 nm or greater and 250 nm or less.

7. The ink jet ink composition according to claim 1, further comprising:

a carbohydrate.

8. The ink jet ink composition according to claim 7, wherein a mass ratio of a content of the phospholipid to a content of the carbohydrate is 0.5 or greater and 5.0 or less.

9. A recording method comprising:

jetting the ink jet ink composition according to claim 1 from an ink jet head to adhere to a recording medium.

10. A recorded material that is formed by adhesion of the ink jet ink composition according to claim 1 to a recording medium.

* * * * *